United States Patent [19]

Ozawa

[11] Patent Number: 4,545,672

[45] Date of Patent: Oct. 8, 1985

[54] READING, PRINTING AND COPYING DEVICE

[75] Inventor: Takashi Ozawa, Kanagawa, Japan

[73] Assignee: Fuji Xerox Co., Ltd., Japan

[21] Appl. No.: 548,489

[22] Filed: Nov. 3, 1983

[30] Foreign Application Priority Data

Dec. 22, 1982 [JP] Japan .................................. 57-225396

[51] Int. Cl.[4] ............................................ G03G 15/00
[52] U.S. Cl. ...................................... 355/3 R; 355/71;
350/331 R
[58] Field of Search ................... 355/3 R, 71; 350/330,
350/331 R, 355; 101/DIG. 13

[56] References Cited

U.S. PATENT DOCUMENTS 4,386,836  6/1983  Aoki et al. .......................... 355/71 X

*Primary Examiner*—R. L. Moses

*Attorney, Agent, or Firm*—Sughrue, Mion, Zinn, Macpeak and Seas

[57] ABSTRACT

A reading, printing and copying device having an image sensor for receiving a predetermined potential and a light beam reflected from an original during a predetermined control period of time, to hold or release the potential according to contents of the original. A memory stores upon reception of a memory instruction, the state of the potential of the image sensor for the following control period of time. A liquid crystal shutter allows or interrupts the transmission of copying light according to the binary level of an input print signal or the memory contents of the memory. An original reading signal output device outputs an original reading signal according to the potential of the image sensor or the memory contents of memory. A photosensitive copying device reproduces the original by utilizing the operation of the liquid crystal shutter so that copying light is transmitted or interrupted.

12 Claims, 10 Drawing Figures

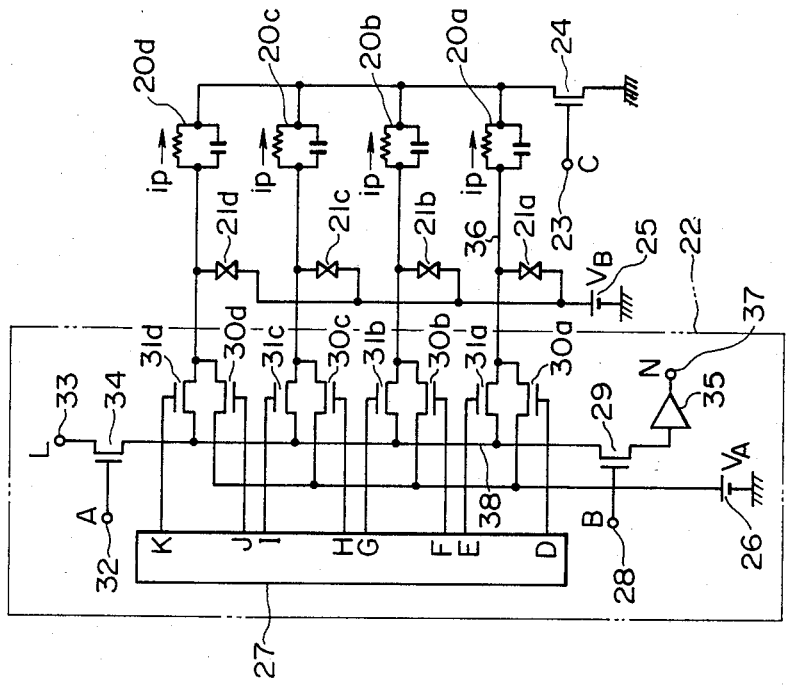
FIG. 2
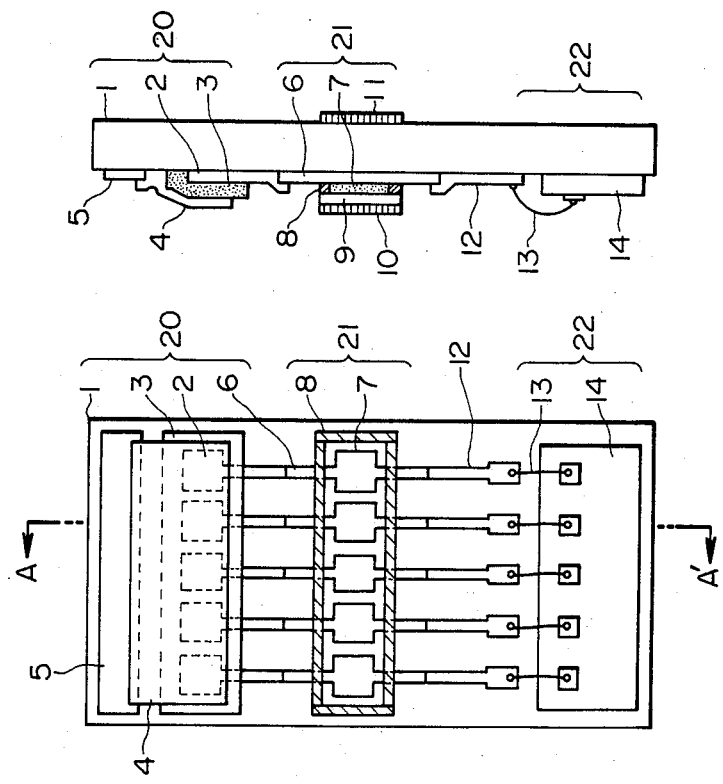
FIG. 1(a)
FIG. 1(b)

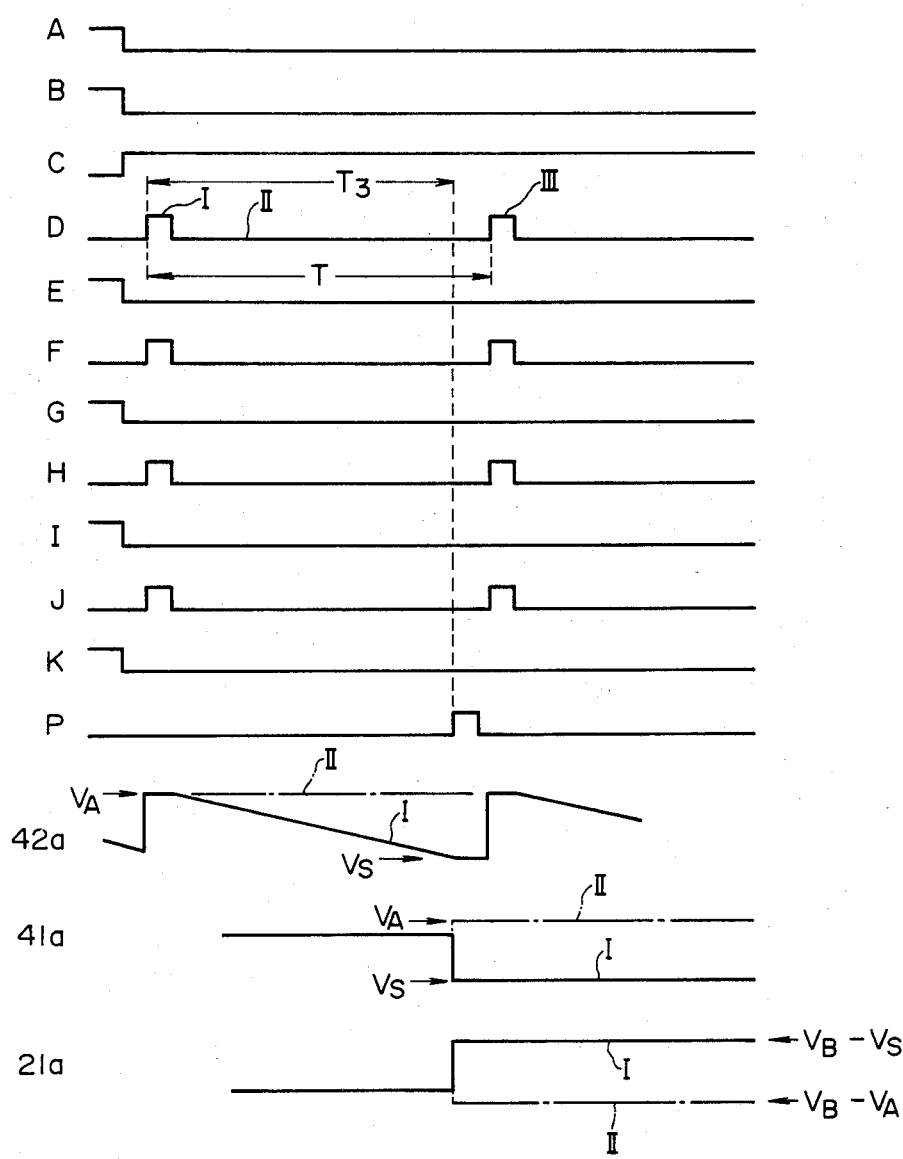

READING, PRINTING AND COPYING DEVICE

BACKGROUND OF THE INVENTION

This invention relates to a reading, printing and copying device functioning to converting data on an original into electrical signals, reproducing the original from the electrical signals and copying the original, and in which the operational efficiencies of liquid crystal shutters for controlling the copying light beam are improved. Thus, the capacity of the light source, namely, a lamp is reduced.

A patent application entitled "A reading, printing and copying device" filed on the same day as this application, commonly assigned, Ser. No. 548,490 describes a device shown in FIGS. 1(a) and 1(b) herein. As shown in FIG. 1(a) and FIG. 1(b), split electrodes made of a metal film of Cr, Al, Ni or Au are formed on a transparent substrate 1 of glass or the like and are covered by a photo-conductive layer 3 of semiconductor material such as amorphous-Si, Se—As—Te or CdS. A transparent conductive film 4 of ITO or $SnO_2$ is formed on the photo-conductive layer 3 and is connect to an electrode 5. The split electrodes 2 are connected to transparent conductive films 6 which are made of the same material as the transparent conductive film 4. A liquid crystal 7 surrounded by seal members 8 and sealed by a transparent conductive film 9 is provided on the transparent conductive films 6. Polarizing plates 10 and 11 are provided on the surface of the transparent conductive film 9 and the rear surface of the substrate 1, respectively. The transparent conductive films 6 are connected to electrodes 12 formed on the substrate 1, which are connected to a drive circuit 14 through lead wires 13. In the device thus constructed, portion 20 functions as a film image sensor, portion 21 as a liquid crystal shutter, and portion 22 as a drive unit.

FIG. 2 is a circuit diagram showing the device in FIG. 1(a) and FIG. 1(b). The device comprises: film image sensors 20a, 20b, 20c and 20d each being a parallel circuit of a resistor and a capacitor; liquid crystal shutters 21a, 21b, 21c and 21d having first terminals connected to a bias source 25 (having a bias potential $V_B$) and second terminals connected to electrodes 36 (corresponding to the split electrodes 2, the transparent conductive films 6, the electrodes 12 and the lead wires 13); a MOS transistor 24 connected through the electrode 5 to the film image sensors 20a, 20b, 20c and 20d, for receiving a signal C (the transistor 24 being rendered conductive when the signal C is "high 1"); MOS transistors 30a, 30b, 30c and 30d whose control terminals are connected to terminals D, F, H and J of a shift register 27, the transistors 30a through 30d applying the bias potential $V_A$ to the electrodes 36 when rendered conductive; and MOS transistors 31a, 31b, 31c and 31d whose control terminals are connected to terminals E, G, I and K of the shift register 27. The transistors 31a through 31d are adapted to control the connection to MOS transistors 29 and 34. The MOS transistor 29 receives a signal B. When the signal B is "1", the MOS transistor 29 is rendered conductive, so that the state of the electrode 36, after being amplified by an amplifier 35, is outputted, as a signal N, from the terminal 37. The MOS transistor 34 receives a signal A. When the signal A is "1", the transistor 34 is rendered conductive, so that a signal L is applied through the terminal 33 to the electrode 36.

The operation of the device organized as illustrated in FIG. 2 will be described.

(1) Operation of converting data on an original into electrical signals (FIG. 3):

Assume first that signals "low 0", "1" and "1" are applied, as the signals A, B and C, to the control terminals 32, 28 and 23 of the MOS transistors 34, 29 and 24, respectively. In this case, the MOS transistor 34 is turned off, and the MOS transistors 29 and 24 are turned on. When, in the case where signals D through K having a period T are applied from the shift register 27 through the terminals D through K to the control terminals of the MOS transistors 30a through 30d and 31a through 31d, the signal D is "1" (as indicated at waveform D pulse i), the MOS transistor 30a is turned on. As a result, the capacitor of the film image sensor 20a is charged to the potential $V_A$ by the bias source 26.

When the signal D is set to "0" (as indicated at ii), the MOS transistor 30a is turned off. When the film image sensor 20a is illuminated upon illumination of the original, the resistance of the photoconductive film 3 is decreased to allow a photocurrent ip (FIG. 2) to flow in the sensor, so that the charge potential $V_A$ is decreased towards a potential $V_S$. When the signal E is raised to "1" (as indicated at i) next pulse, the MOS transistor 31a is turned on. As a result, the potential of the electrode 36 which has been decreased to $V_S$ is provided, as the signal N, at the terminal 37 through the MOS transistor 29 which is conductive and the amplifier 35. When the signal F is raised to "1", the film image sensor 20b is similarly charged to $V_A$. If it is not illuminated according to the state of the original, the potential $V_A$ is maintained unchanged. Therefore, when the signal G is raised to "1" (as indicated at i), the potential $V_A$ is outputted, as the signal N, from the terminal 37. As the above-described operation is repeatedly carried out, the signals N are outputted from the terminal 37 in response to the illumination of the film image sensors 21a through 21d.

(2) Operation of reproducing an original from electrical signals (FIG. 4):

When signals "1", "0" and "0" are applied, as the signals A, B and C, to the control terminals 32, 28 and 23 of the MOS transistors 34, 29 and 24, respectively, the MOS transistor 34 is turned on and the MOS transistors 29 and 24 are turned off. Signals "0" are applied, as the signals D, F, H and J, to the control terminals of the MOS transistors 30a through 30d through the terminals D, F, H and J by the shift register 27, so that transistors 30a through 30d are rendered non-conductive. When, under this condition, a picture signal L (in which $V_C$ is the high level and 0 is the low level) is applied through the terminal 33 of the MOS transistor 34 and the signals E, G, I and K timed as shown in FIG. 4 are applied to the control terminals of the MOS transistors 31a through 31d through the terminals E, G, I and K from the shift register 27, the liquid crystal shutter 21a becomes transparent (indicated at i) receiving the potential $V_B$ of the bias source 25. This occurs because, when signal E is raised to "1", the MOS transistor 31a is rendered conductive (as indicated at i) so that a signal "0" is applied, as the picture signal L, to the electrode 36. When the signal E is set to "0" (as indicated at ii), the MOS transistor 31a is rendered non-conductive, so that the above-described state is maintained unchanged. When a signal "1" is applied, as the signal G, to the control terminal of the MOS transistor 31b, it is rendered conductive. Therefore, the liquid crystal shutter 21b receives the high level $V_C$ as the picture signal L through the electrode 36, and accordingly the potential difference across the shutter 21b becomes $V_B - V_C \approx 0$. As a result, the liquid crystal shutter 21b becomes opaque (as indicated at i). When the signal E is raised to "1" again (as indicated at iii), the picture signal L is at the high level $V_C$, and $V_B - V_C$ is applied to the liquid crystal shutter 21a. As a result, the liquid crystal shutter 21a becomes opaque. The liquid crystal shutters 21c and 21d can be made transparent and opaque according to the picture signal L when they are controlled by the signals I and K, respectively.

(3) Operation of copying an original (FIG. 5):

A signal 0 is applied, as the signal A, to the control terminal 32 of the MOS transistor 34, a signal "0" is applied, as the signal B, to the control terminal 28 of the MOS transistor 29 and a signal "1" is applied, as the signal C, to the control terminal 23 of the MOS transistor 24, so that the MOS transistors 29 and 34 are turned off while the MOS transistor 24 is turned on. The shift register 27 outputs the signals D, F, H and J. When the signal D is raised to "1" (as indicated at i), the MOS transistor 30a is rendered conductive, so that the capacitor of the film image sensor 20a is charged to the potential $V_A$ by the bias source 26. If the image sensor 20a is illuminated when the MOS transistor 30a is turned off with the signal D set to 0 (as indicated at ii), it is discharged through the MOS transistor 24, and therefore its potential is decreased from the charge potential $V_A$ to the discharge potential $V_S$.

In response the voltage applied to the liquid crystal shutter 21a is increased from $V_B - V_A$ (i.e., the difference between the potential $V_B$ of the bias source 25 and the charge potential) to $V_B - V_S \approx V_B$. When the voltage reaches the threshold value $V_T$ during this increase, the liquid crystal shutter 21a becomes transparent. The state of the liquid crystal shutter 21a is shown in a state diagram $T_O$ in FIG. 5. The liquid crystal shutter 21a is transparent for a period of time $T_2$ which is shown shaded.

The above description is applicable to the remaining liquid crystal shutters 21b, 21c and 21d. The signals E, G, I and K are maintained at 0 as illustrated in FIG. 5.

In the reading, printing and copying device described above, as is apparent from the transparent state diagram $T_O$ of the liquid crystal shutter 21a, the operation of the liquid crystal shutter becomes effective only for the period of time $T_2$ which is a portion of the period of time T of one cycle (because of the presence of the pause period of time $T_1$). Accordingly, it is essential that the capacity of the copying light source such as a lamp is very large.

SUMMARY OF INVENTION

In view of the foregoing, an object of this invention is to provide a reading, printing and copying device in which, in order to improve the operating efficiencies of the liquid crystal shutters for controlling the transmission of the copying light beam for reducing the capacity of the light source, the light reception state of each film image sensor is held for a control period of time of the sensor and the liquid crystal shutter is controlled according to the state of holding.

These and other objects of this invention are attained in a reading, printing and copying device comprising, image sensor means for receiving a predetermined potential and a light beam reflected from an original during a first predetermined control period of time, to hold or release said potential according to contents of said original; memory means for storing, upon reception of a memory instruction, the state of said potential of said image sensor means for a second control period of time following said first control period of time; liquid crystal shutter means for allowing or interrupting the transmission of a copying light beam according to the binary level of an input print signal or the memory contents of said memory means; original reading signal means for outputting an original reading signal according to said potential of said image sensor means or the memory contents of said memory means; and photosensitive copying means for reproducing said original by utilizing the operation of said liquid crystal shutter means so that said copying light beam is transmitted or interrupted.

This invention will be described in greater detail by referring to the attached drawings and the description of the preferred embodiment that follows.

BRIEF DESCRIPTION OF THE DRAWINGS

FIG. 1(a) is a plan view showing a readings, printing and copy device of the co-pending application, Ser. No. 548,490;

FIG. 1(b) is a sectional view taken along line A—A of FIG. 1(a);

FIG. 2 is an electrical circuit diagram of the device shown in FIGS. 1(a) and 1(b);

FIG. 8 is a time chart for a description of the operation of the device according to the invention.

DESCRIPTION OF THE PREFERRED EMBODIMENT

A reading, printing and copying device according to the invention will now be described in detail. Elements identifed in FIG. 1(a) and FIG. 1(b) are given common members.

Figure 3:
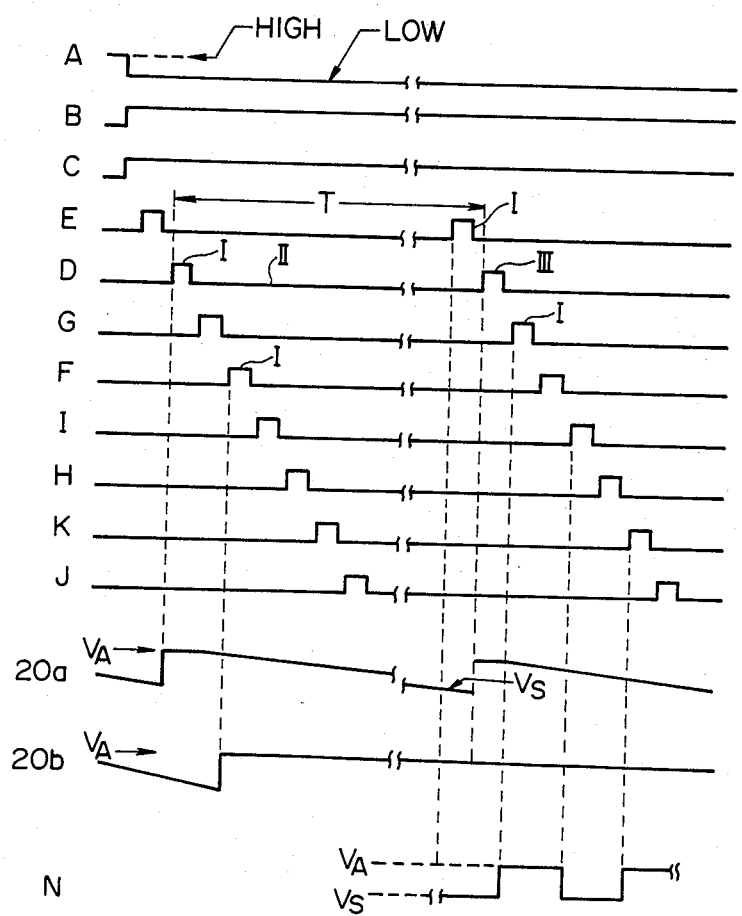
FIGS. 3 through 5 are time charts describing the operation of the device shown in FIG. 1(a), FIG. 1(b) and FIG. 2.
Figure 4:
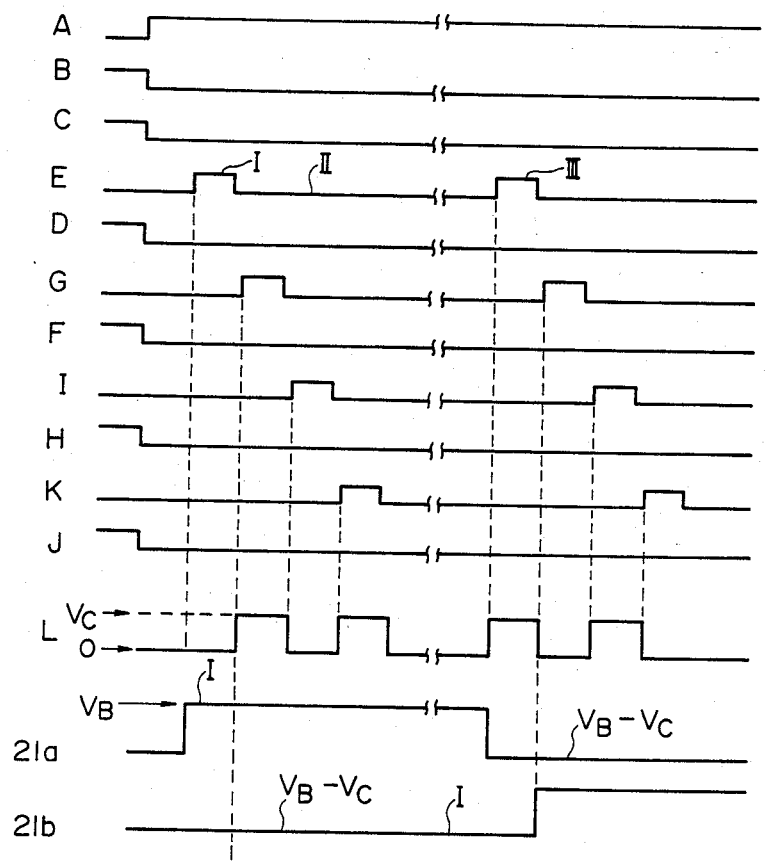
Figure 5:
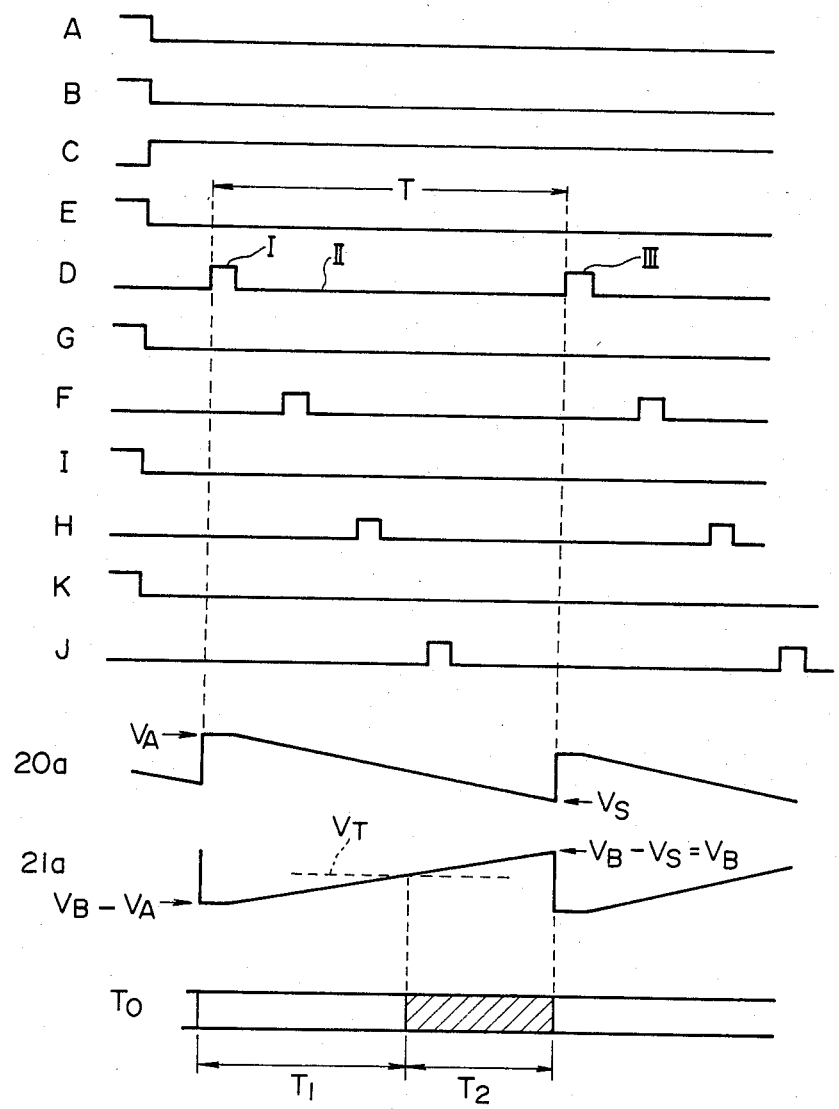
Figure 6A:
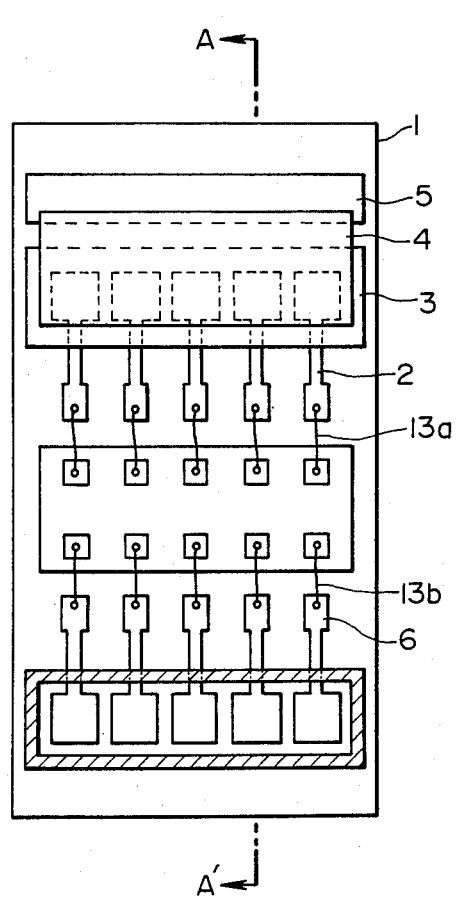
FIG. 6(a) is a plan view of one embodiment of a reading, printing and copying device according to this invention.
Figure 6B:
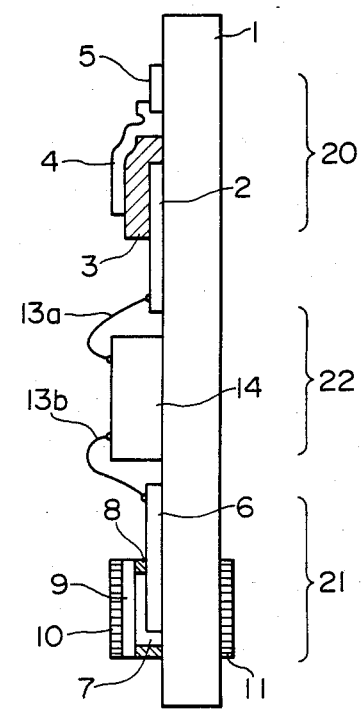
FIG. 6(b) is a sectional view taken along line A—A of FIG. 6(a)

One embodiment of the invention is as shown in FIG. 6(a) and FIG. 6(b). Split electrodes 2 made of metal film of Cr, Al, Ni or Au are formed on a transparent substrate 1 of glass or the like. They are covered by a photo-conductive layer 3 made of semiconductor material such as amorphous-Si, Se—As—Te or CdS. A transparent conductive film 4 (connected to an electrode 5) of ITO or $SnO_2$ is formed on the layer 3. The split electrodes 2 are connected through lead wires 13a to a drive circuit 14. Transparent conductive films 6 are formed on one side of the drive circuit 14. The drive circuit opposite to the other side where the transparent conductive film 4 is provided. The transparent conductive films 6 are made of the same material as that of the transparent conductive film 4, and connected through lead wires 13b to the drive circuit 14. A liquid crystal 7 which is surrounded by a seal member 8 and sealed by a transparent conductive film 9 is formed on the transparent conductive films 6. Polarizing plates 10 and 11 are provided on the surface of the transparent conductive film 9 and the rear surface of the substrate 1, respectively. In the device thus constructed, portion 20 functions as a film image sensor, portion 21 as a liquid crystal shutter, and portion 22 as a drive unit.

Figure 7:
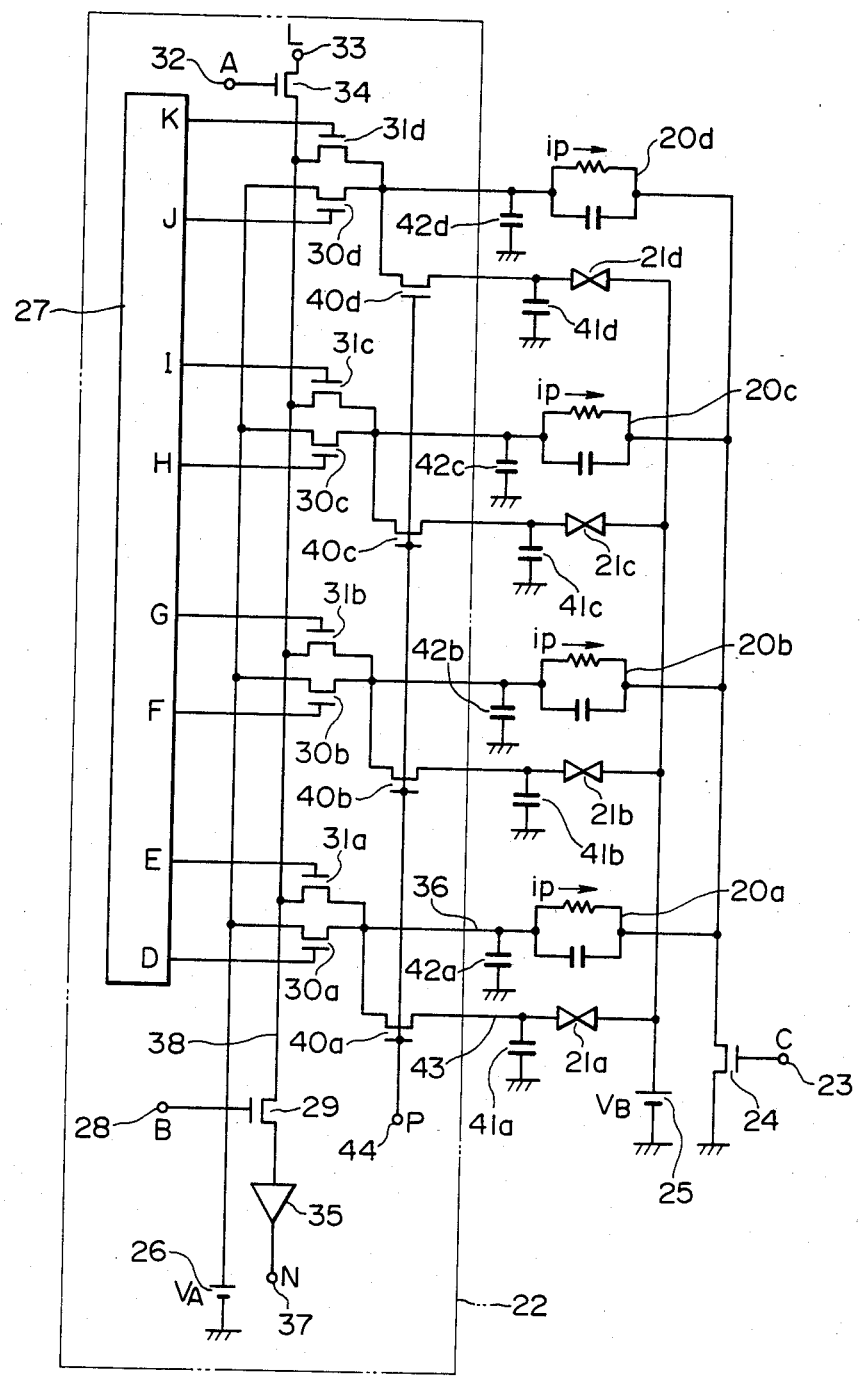
FIG. 7 is a circuit diagram of the device shown in FIG. 6(a) and FIG. 6(b)

FIG. 7 is a circuit diagram showing the device of FIG. 6(a) and FIG. 6(b). The device compises: film images sensors 20a, 20b, 20c and 20d each being indicated as a parallel circuit of a resistor and a capacitor (an electrode 36 connected to each film image sensor corresponding to the split electrode 2 and the lead wire 13a); liquid crystal shutters 21a, 21b, 21c and 21d having first terminals connected to a bias source 25 having a bias potential $V_B$ and having second terminals connected to electrodes 43 (corresponding to the transparent conductive films 6 and the lead wires 13b); a MOS transistor 24 connected to the film image sensors 20a, 20b, 20c and 20d, and receiving a signal C through its control terminal 23 (the transistor 24 being rendered conductive when the signal C is "1"); MOS transistors 30a, 30b, 30c and 30d whose control terminals are connected to terminals D, F, H and J of a shift register 27, each of the transistor 30a through 30d being turned on when receiving a signal "1" through its control terminal, to apply the bias potential $V_A$ of a bias source 26 to the respective electrode 36; MOS transistors 31a, 31b, 31c and 31d having their control terminals connected to terminals E, G, I and K of the register 27, each of the transistors 31a through 31d being rendered conductive upon reception of a signal "1" through its control terminal, to connect the respective electrode 36 to MOS transistors 29 and 34; and MOS transistors 40a, 40b 40c and 40d which, upon reception of a signal "1" through a terminal 44, are rendered conductive to connect the film image sensors 20a, 20b, 20c and 20d to the liquid crystal shutters 21a, 21b, 21c and 21d, respectively.

Capacitances 42a, 42b, 42c and 42d formed between the electrodes 36 and the ground are the sums of the drain capacitances of the MOS transistors 30a through 30d, 31a through 31d and 40a through 40d and the stray capacitances of the electrodes 36, respectively. Capacitances 41a, 41b, 41c and 41d formed between the electrodes 43 and the ground are the source capacitances of the MOS transistors 40a through 40d and the stray capacitances of the electrodes 43. The capacitances 42a through 42d are larger than the capacitances 41a through 41d. The MOS transistor 29 receives a signal B through its control terminal 28. When the signal B is "1", the transistor 29 is turned on, so that the state of a signal line 38 is applied to an amplifier 35 to be provided as a signal N at the terminal 37. The MOS transistor 34 receives a signal A through its control terminal 32. When the signal A is "1", the MOS transistor 34 is rendered conductive, to apply a signal L from the terminal 33 to the signal line 38.

The operation of the device thus arranged will be described.

(1) Operation of converting data on an original into electrical signals:

When a signal "1" is applied, as a signal P, to the common control terminal of the MOS transistors 40a, 40b, 40c and 40d, the MOS transistors are turned on, so that the film image sensors 20a through 20d are connected directly to the respective liquid crystal shutters 21a through 21d. The succeeding operation will not be described here because it is the same as that described herein with respect to the co-pending application.

(2) Operation of reproducing an original from electrical signals:

The MOS transistors 40a through 40d are turned on as described herein so that the signal line 38 is connected directly to the liquid crystal shutters 21a through 21d. The following operations will not be described here because they are the same as those described herein with respect to the aforementioned co-pending application.

(3) Operation of copying an original:

Referring to FIG. 8, signals 0 are applied, as signals A and B, to the control terminals of the MOS transistors 34 and 29 to render the MOS transistors 34 and 29 non-conductive, and a signal "1" is applied, as the signal C, to the control terminal of the MOS transistor 24 to render transistor 24 conductive. The signals E, G, I and K at the terminals E, G, I and K of the shift register 27 are set to O to turn off the MOS transistors 31a through 31d, so that the film image sensors 20a through 20d and the liquid crystal shutters 21a through 21d are electrically disconnected from the signal line 38. On the other hand, signals D, F, H and J having a period T as shown in FIG. 8 are provided through the terminals D, F, H and J of the shift register 27. When the signal D is raised to "1" (as indicated as pulse i), the MOS transistor 30a is turned on, so that the capacitance 42a of the electrode 36 is charged by the bias voltage $V_A$ of the bias source 26 until the potential of the electrode 36 is increased to the value $V_A$. When the signal D is set to "0" (as indicated at ii), the MOS transistor 30a is turned off. In this condition, the film image sensor 20a is illuminated, the capacitor 42a is discharged through the MOS transistor 24. As a result the potential of the capacitor 42a is decreased from the charge potential $V_A$ to the discharge potential $V_S$ (as indicated at i). Conversely, when the image sensor 20a is not illuminated, the charge potential $V_A$ is maintained unchanged (as indicated as pulse ii). When a signal "1" is applied, as the signal P, to the control terminal 44 of the MOS transistors 40a through 40d a period of time $T_3$ after the signal D is raised to "1", transistors 40a through 40d are rendered conductive, so that the film image sensors 20a through 20d are connected directly to the liquid crystal shutters 21a through 21d for the period of time for which the signal P is maintained at "1".

Therefore, the potential $V_A$ or $V_S$ of the capacitor 42a is transferred to the capacitor 41a (as indicated at i or ii). When the potential $V_A$ is transferred to the capacitor 41a, $V_B - V_A \approx 0$ is applied to the liquid crystal shutter 21a (as indicated at ii), so that the shutter interrupts the transmission of light. When the potential $V_S$ is transferred thereto, that is where the preceding potential of the capacitor 41a is $V_A$, it can be decreased to $V_S$ when the MOS transistor 40a is turned on, $V_B - V_S \approx V_B$ is applied to the liquid crystal 21a (as indicated at i), the liquid crystal shutter 21a can transmit light. This transmission of light is maintained for the period of time (being longer than $T_3$) which elapses until the signal P is next raised to "1". Accordingly, the capacity of the light source, namely, a lamp (not shown) can be smaller. In the case where the light source is disposed over the liquid crystal shutters 40a through 40d, the photo-sensitive drum is placed under the shutters.

Although the operation has been described with respect to the liquid crystal shutter 21a, the same applies for the remaining liquid crystal shutters 21b through 21d.

As is apparent from the above discription, in the reading, printing and copying device according to the invention, the light reception state of each film image sensor is held for the succeeding control period of time of the sensor, and the respective liquid crystal shutter for controlling the transmission of copying light is controlled according to the state of holding. Therefore, the operating efficiency of each liquid crystal shutter is improved, whereby the capacity of the light source can be reduced.

I claim:

1. A reading, printing and copy device, comprising:
   image sensor means for receiving a predetermined potential and a light beam reflected from an original during a first predetermined control period of time, to hold or release said potential according to contents of said original;
   memory means for storing, upon reception of a memory instruction, the state of said potential of said image sensor means for a second control period of time following said first control period of time;
   shutter means for transmitting or interrupting the transmission of a copying light beam according to a input signal;
   orignal reading signal output means for outputting an original reading signal; and
   photo-sensitive copying means for reproducing said original by utilizing the operation of said shutter means so that said copying light beam is transmitted or interrupted.

2. The device of claim 1 wherein said shutter means comprises a liquid crystal.

3. The device of claim 2 wherein said liquid crystal is responsive to a binary level input print signal.

4. The device of claim 2 wherein said liquid crystal is responsive to the contents of said memory means.

5. The device of claim 1 wherein said original reading signal output means is responsive to the potential of said image sensor means.

6. The device of claim 1 wherein said original reading signal output means is responsive to the contents of said memory means.

7. The device of claim 1 wherein said image sensor means comprises a transparent substrate, metal electrodes formed on said substrate, a photo-conductive layer disposed over said electrodes and a transparent conductive film formed on said photo-conductive layer.

8. The device of claim 7 wherein said metal electrodes are 2 split metal films.

9. The device of claim 8 wherein said metal film is selected from the group consisting of Cr, Al, Ni or Au.

10. The device of claim 7 wherein said shutter means comprises a liquid crystal formed on said substrate.

11. The device of claim 1 wherein said shutter means comprises a liquid crystal formed on a substrate and a transparent conductive film, means to seal said liquid crystal and a pair of polarizing plates disposed on opposite sides of said substrate.

12. The device of claim 1 wherein said shutter means and said image sensor means are formed on a common substrate and separted by a drive circuit, said image sensor means forming a parallel resistor and capacitor circuit, said drive circuit including a MOS transistor for selectively coupling said image sensor means to said shutter means.

* * * * *